US010539260B2

(12) United States Patent
Hielscher et al.

(10) Patent No.: US 10,539,260 B2
(45) Date of Patent: Jan. 21, 2020

(54) HOSE CLAMP

(71) Applicant: NORMA Germany GmbH, Maintal (DE)

(72) Inventors: Martin Hielscher, Heilbad Heiligenstadt (DE); Enrico Grosse, Uder (DE); Thomas Brauer, Thalwenden (DE); Oliver Leusner, Taunusstein (DE)

(73) Assignee: NORMA Germany GmbH, Maintal (DE)

( * ) Notice: Subject to any disclaimer, the term of this patent is extended or adjusted under 35 U.S.C. 154(b) by 0 days.

(21) Appl. No.: 15/779,475

(22) PCT Filed: Nov. 15, 2016

(86) PCT No.: PCT/EP2016/077685
§ 371 (c)(1),
(2) Date: May 25, 2018

(87) PCT Pub. No.: WO2017/089173
PCT Pub. Date: Jun. 1, 2017

(65) Prior Publication Data
US 2018/0259104 A1 Sep. 13, 2018

(30) Foreign Application Priority Data
Nov. 26, 2015 (DE) .......................... 10 2015 120 509

(51) Int. Cl.
F16L 33/08 (2006.01)
(52) U.S. Cl.
CPC .................................... F16L 33/08 (2013.01)

(58) Field of Classification Search
CPC ...................................................... F16L 33/08
See application file for complete search history.

(56) References Cited

U.S. PATENT DOCUMENTS 3,407,448 A * 10/1968 Tetzlaff ................... F16L 33/10
24/19
3,477,106 A * 11/1969 Tetzlaff ................... F16L 33/02
24/279

(Continued)

FOREIGN PATENT DOCUMENTS

DE 102006048344 A1 4/2008
DE 202011005396 U1 6/2011

(Continued)

OTHER PUBLICATIONS

International Search Report for PCT/EP2016/077685, dated Jan. 24, 2017, 2 pages.

(Continued)

Primary Examiner — Robert Sandy
Assistant Examiner — David M Upchurch
(74) Attorney, Agent, or Firm — Reising Ethington, P.C.

(57) ABSTRACT

The disclosure relates to a hose clamp having a clamping strip, a clamping device and a positioning arrangement with at least one positioner which has a base and a claw that can be pressed into a hose wall. According to the disclosure, a spring arrangement having an inner strip and a wave washer is arranged on a radial inner side of the clamping strip, the positioner being arranged on the inner strip of the spring arrangement.

11 Claims, 1 Drawing Sheet

(56) References Cited

U.S. PATENT DOCUMENTS

| | | | | |
|---|---|---|---|---|
| 8,607,421 B2* | 12/2013 | Col | .................. | F16L 33/08 24/274 R |
| 2008/0098572 A1* | 5/2008 | Krauss | .................. | F16L 33/08 24/19 |
| 2008/0098575 A1* | 5/2008 | Krauss | .................. | F16L 33/08 24/279 |
| 2010/0281655 A1* | 11/2010 | De Campos | ............ | F16L 33/08 24/19 |

FOREIGN PATENT DOCUMENTS

| | | |
|---|---|---|
| DE | 202011110545 U1 | 9/2014 |
| EP | 1912008 A2 | 4/2008 |
| EP | 2058575 A1 | 5/2009 |
| JP | 2008095961 A | 4/2008 |
| JP | 2011503467 A | 1/2011 |

OTHER PUBLICATIONS

English Translation of International Search Report for PCT/EP2016/077685, dated Jan. 24, 2017, 2 pages.
1st German Office Action for DE 10 2015 120 509.2 dated Aug. 3, 2016, 6 pages.
2st German Office Action for DE 10 2015 120 509.2 dated Sep. 16, 2016, 4 pages.
Japanese Office Action for Application No. 2018-527807 dated Jun. 18, 2019 (4 pages).
English Translation of Japanese Office Action for Application No. 2018-527807 dated Jun. 18, 2019 (7 pages).

* cited by examiner

Stand der Technik

HOSE CLAMP

The disclosure relates to a hose clamp having a clamp band, a clamping device and a positioning arrangement with at least one positioner which has a base and a claw which is pressable into a hose wall, wherein a spring arrangement having an inner band and a corrugated spring is arranged on a radial inner side of the clamp band.

A hose clamp of this type is known, for example, from DE 10 2006 048 344 B4. Said hose clamp has a multiplicity of components, namely a spring arrangement, a first positioner, which is fastened to an outer side of the clamp band diametrically opposite the clamping device, and a second positioner, which is arranged on a spring bridge and is positioned on an inner side of the clamp band in the region of the clamping device. The positioning arrangement with the first positioner and the second positioner serves here for the axial positional securing of the hose clamp before clamping of the hose clamp by the claws of the positioners being pressed radially into the hose wall and correspondingly holding the hose clamp. The spring clip here is movable in relation to the clamp band in order to permit the movement required for clamping the clamp band.

The spring arrangement having an inner band and corrugated spring produces a radial action of force with the effect of producing a prestress between the clamp band and the hose wall. The spring arrangement thereby permits temperature compensation and compensation for age-induced settling processes.

A hose clamp of this type operates satisfactorily per se. However, the production of the hose clamp is relatively complicated because of the multiplicity of the individual components.

SUMMARY

The disclosure is therefore based on, in at least one embodiment, the object of providing a hose clamp which has a simpler design and in particular can be produced cost-effectively with little outlay.

In the case of a hose clamp having a clamp band, a clamping device and a positioning arrangement with at least one positioner which has a base and a claw which is pressable into a hose wall, wherein a spring arrangement having an inner band and a corrugated spring is arranged on a radial inner side of the clamp band, it is provided according to the disclosure that the positioner is arranged on the inner band of the spring arrangement. The corrugated spring is arranged in particular between the clamp band and the inner band, and therefore the clamp band can be of continuous design apart from in the region of the clamping device. The clamp band itself can therefore be manufactured very simply and nevertheless stably. By means of the arrangement of the positioner on the inner band of the spring arrangement, the positioner can already be premanufactured with the spring arrangement before it is mounted together with the spring arrangement on the clamp band. The number of individual components for producing the hose clamp is thus reduced. This results in simpler production of the hose clamp with low cycle times and possibly even reduced use of material.

In a preferred refinement, the spring arrangement is arranged offset in the circumferential direction in relation to the clamping device. Since the spring arrangement requires an amount of construction space in the radial direction, it is advantageous for said spring arrangement to be offset in relation to the clamping device which likewise extends radially outward.

It is particularly preferred here, in at least some embodiments, for the spring device to be arranged approximately diametrically opposite the clamping device. This results in a symmetrical design.

The spring arrangement is preferably secured in the circumferential direction at least at one end to the clamp band. The position of the spring arrangement on the clamp band is therefore predetermined such that the positioner also is always located at a predetermined position of the clamp band. The positioner in conjunction with the spring arrangement thus results in a secure support of the hose clamp on a hose in the axial direction, in the circumferential direction and also in the radial direction.

In a preferred refinement, the inner band is held at its end on the clamp band by sheet metal lugs which are bent around the clamp band. This constitutes a simple possibility of fastening the inner band and therefore the spring arrangement with the positioner to the clamp band without additional fastening means being required.

The corrugated spring is preferably fastened to the inner band. This simplifies the production of the hose clamp since the corrugated spring can then already be preassembled on the inner band and only the inner band has to be fastened to the clamp band.

In a preferred refinement, the positioner is fastened to the inner band via a stamping or clinching connection. This can already be undertaken prior to the completion of the hose clamp. A connection of this type manages without additional components and is relatively stable.

In an alternative refinement, the positioner is formed integrally with the inner band. For example, the inner band is designed as a sheet metal part, wherein the clips of the positioner can be formed by bending over corresponding axial projections. This constitutes a particularly simple and stable configuration.

The positioner is preferably arranged in a region of the inner band, in which the corrugated spring is maximally spaced apart from the inner band. The corrugated spring has, for example, two wave crests and is then fixed to the inner band at least centrally between the wave crests. Sufficient space is then available for the positioner in the region of the wave crests.

In a preferred development, the positioning arrangement has a second positioner which is arranged on a spring bridge which is connected movably to the clamp band. The hose clamp can therefore be pre-positioned particularly securely on a hose since it is held at two defined points. By means of the moveable connection of the spring bridge to the clamp band, clamping of the hose clamp nevertheless remains easily possible.

The spring bridge is preferably arranged here in the region of the clamping device. The spring bridge can then cover a gap in the region of the clamping device and thus protects the hose wall against contact with the clamping device and prevents damage during the clamping.

DESCRIPTION OF THE FIGURES

The disclosure is described in more detail below with reference to a preferred exemplary embodiment in conjunction with the drawing, in which.

DETAILED DESCRIPTION

Figure 1:
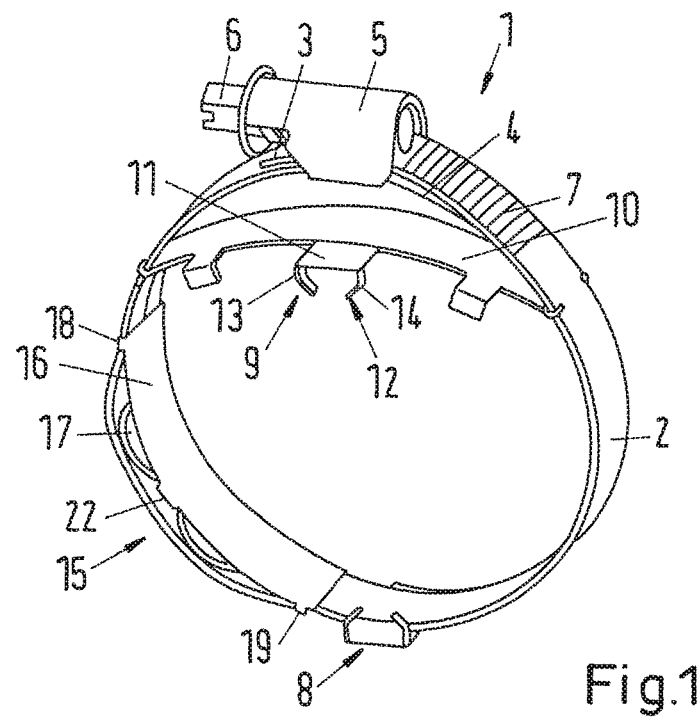
FIG. 1 shows a perspective illustration of a hose clamp according to the prior art.

The hose clamp 1 illustrated in FIG. 1 has a clamp band 2 which is bent annularly, wherein an outer end 3 comes to lie over an inner end 4. A clamping device 5 connects the two ends 3, 4 and has a clamping screw 6 which engages in a threaded embossment 7. The threaded embossment 7 is formed here in an outer side of the clamp band 2. When the clamping screw 6 is tightened, the two ends 3, 4 of the hose band 2 are moved relative to each other in the circumferential direction of the hose clamp 1, and therefore an inside diameter of the hose clamp 1 is reduced.

A hose clamp 1 of this type serves to tightly clamp a hose (not illustrated specifically) on a pipe end. For this purpose, the hose clamp 1 is placed onto the hose. The hose is then pushed onto the pipe end and then the hose clamp 1 is clamped. For this purpose, it is advantageous in at least one embodiment if the clamping device 5 is located at a defined position on the hose and is also secured there such that a fitter can act on the clamping screw 6 with a tool.

In order to ensure this positioning, the hose clamp 1 has a positioning arrangement having a first positioner 8 and a second positioner 9. The positioners 8, 9 are of substantially identical design, wherein the first positioner 8, in the solution known from the prior art, is fastened directly to the clamp band 2 and lies diametrically opposite the clamping device 5 since the second positioner 9 is arranged on a spring bridge 10 which is positioned on an inner side of the clamp band 2.

The positioners 8, 9 each have a base 11 from which in each case radially inwardly directed clips 12 in the form of two webs 13, 14 emanate. The webs 13, 14 comprise portions emanating vertically from the base 11 and being directed into the interior of the space surrounded by the clamp band 2, and adjoining, angled end portions which point toward each other. When the claw 12 penetrates into a hose wall, this configuration leads to deformation of the webs 13, 14 in such a manner that they move toward each other and therefore do not completely pierce the hose wall.

The hose clamp 1 furthermore has a spring arrangement 15 having an inner band 16 and a corrugated spring 17. The spring arrangement 15 is used to introduce a pretensioning force which acts inward in the radial direction and can compensate firstly for temperature differences and secondly for differences in diameter. A secure support of a correspondingly prepositioned hose clamp therefore also arises in the radial direction.

The inner band 16 of the spring arrangement 15 is fastened at its ends by sheet metal lugs 18, 19 which are bent around the clamp band 2. The corrugated spring 17 lies here between an outer side of the inner band 16 and an inner side of the clamp band 2.

Figure 2:
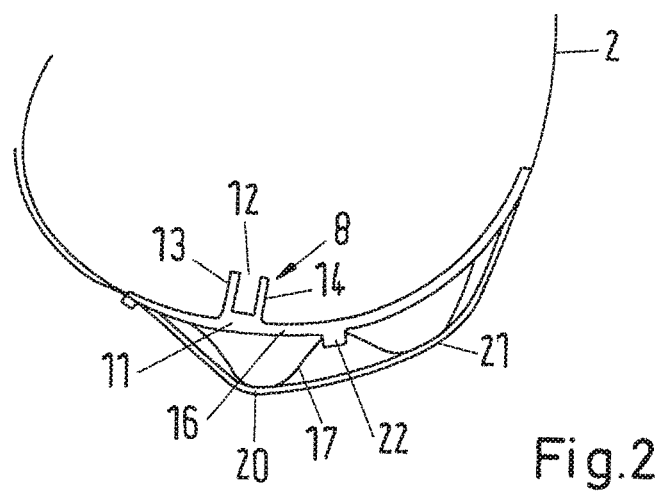
FIG. 2 shows the development according to the disclosure of the hose clamp.

In contrast to this known hose clamp, the configuration according to the disclosure makes provision for the first positioner 8 not to be designed as an integral component, but rather to be integrated in the spring arrangement 15. This is shown in FIG. 2. The first positioner 8 is arranged here in the region of a wave crest 20 of the corrugated spring 17, wherein the corrugated spring 17 has two wave crests 20, 21 and is fastened to the inner band 16 centrally between the wave crests 20, 21 via a sheet metal lug 22.

In comparison to the configuration as known from the prior art, simplified production of the hose clamp with few individual components therefore results. The first positioner can thus be integrated in the spring arrangement and permits simple manufacturing. It is provided in particular here that the spring arrangement is connected relatively fixedly at least on one side to the clamp band 2 so that a position of the positioner, which is formed together with the spring arrangement 15, is fixed on the clamp band in the circumferential direction.

In addition, of course, the hose clamp according to the configuration in FIG. 2 can also have a second positioner with a spring bridge 10, as is shown in FIG. 1. This therefore results in a particularly secure support of the hose clamp on a hose end and therefore in secure prepositioning.

The invention claimed is:

1. A hose clamp comprising a clamp band, a clamping device and a positioning arrangement with at least one positioner which has a base and a claw which is pressable into a hose wall, wherein a spring arrangement having an inner band and a corrugated spring is arranged on a radial inner side of the clamp band and wherein the at least one positioner is arranged on the inner band of the spring arrangement, wherein the corrugated spring has two wave crests and is fastened to the inner band centrally between the wave crests, and wherein the at least one positioner is arranged in a region of one of the two wave crests.

2. The hose clamp as claimed in claim 1, wherein the spring arrangement is arranged offset in a circumferential direction in relation to the clamping device.

3. The hose clamp as claimed in claim 1, wherein the spring arrangement is fixed to the clamp band in a circumferential direction.

4. The hose clamp as claimed in claim 1, wherein the inner band is held at ends of the inner band on the clamp band by sheet metal lugs which are bent around the clamp band.

5. The hose clamp as claimed in claim 1, wherein the corrugated spring is fastened to the inner band.

6. The hose clamp as claimed in claim 1, wherein the at least one positioner is fastened to the inner band.

7. The hose clamp as claimed in claim 1, wherein the at least one positioner is formed integrally with the inner band.

8. The hose clamp as claimed in claim 1, wherein the at least one positioner is arranged in a region of the inner band in which the corrugated spring is maximally spaced apart from the inner band.

9. The hose clamp as claimed in claim 1, wherein the positioning arrangement has a second positioner which is arranged on a spring bridge which is connected movably to the clamp band.

10. The hose clamp as claimed in claim 9, wherein the spring bridge is arranged in a region of the clamping device.

11. The hose clamp as claimed in claim 1, wherein the at least one positioner is arranged in a region of the inner band in which the corrugated spring is maximally spaced apart from the inner band.

* * * * *